(No Model.)

N. OFER.
CHURN.

No. 588,286. Patented Aug. 17, 1897.

WITNESSES

INVENTOR
Nicholas Ofer,
By John Wedderburn
Attorney

UNITED STATES PATENT OFFICE.

NICHOLAS OFER, OF DALE, INDIANA.

CHURN.

SPECIFICATION forming part of Letters Patent No. 588,286, dated August 17, 1897.

Application filed March 18, 1897. Serial No. 628,075. (No model.)

*To all whom it may concern:*

Be it known that I, NICHOLAS OFER, a citizen of the United States, residing at Dale, in the county of Spencer and State of Indiana, have invented certain new and useful Improvements in Churns; and I do hereby declare the following to be a full, clear, and exact description of the invention, such as will enable others skilled in the art to which it appertains to make and use the same.

My invention relates to certain new and useful improvements in churns of the multiple-dasher type; and its object is to provide a simple and effective construction of device for facilitating the churning operation.

To this end my invention consists in certain novel details of construction, combinations, and arrangements of parts as will be hereinafter more fully described, and specifically pointed out in the appended claim.

Figure 1:
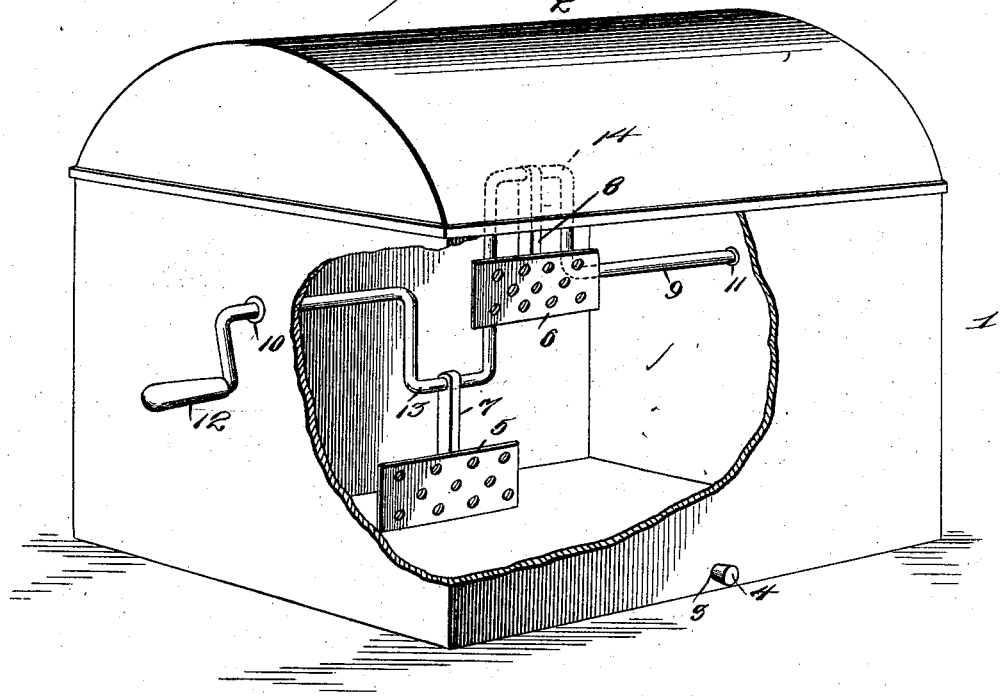
Figure 2:
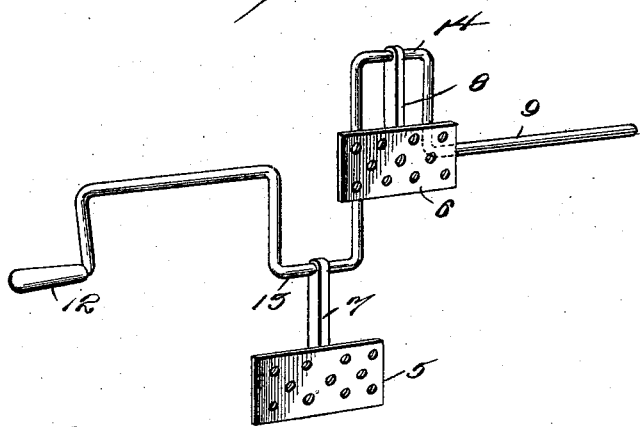

In the accompanying drawings, Figure 1 is a perspective view of a churn embodying my invention, parts being broken away to show the construction. Fig. 2 is a detail perspective view showing the dashers and operating mechanism connected together removed from the churn.

Like numerals designate corresponding parts throughout the several figures of the drawings.

Referring to the drawings, the numeral 1 designates the churn receptacle or casing, which may be constructed of any desired shape, but in the present instance is shown as rectangular. The casing is provided with a semicircular top 2 and an opening 3 in its side wall for the eduction of the skim-milk, said opening being closed by a plug 4.

The dashers 5 6 are provided with holes or openings, for a purpose well understood, and are carried by connecting-rods 7 8, respectively, which are pivotally attached to and adapted to be operated by a crank-shaft 9. This crank-shaft 9 has its opposite ends projecting through stuffing-boxes or bushings 10 11 in the side walls of the casing, and one of said ends is bent to form a handle portion, provided with a cover of wood or other material constituting a handle 12. The central portion of this crank-shaft is bent in opposite directions to form two crank-attaching portions 13 14, to which the connecting-rods 7 8 of the dashers are pivoted, so that by revolving the said crank-shaft a vertical reciprocating motion may be imparted to the said dashers as well as a rotary motion, the dashers being carried around by the sloshing or agitation of the milk or cream.

I have found that by this construction of churn the milk may be converted into butter in a comparatively short time and that a larger proportion of the cream is separated and a greater amount of butter produced from a given amount of milk than is produced by churns of ordinary construction. This is effected by the combined rotary-reciprocatory action of the dashers.

My invention provides a simple and effective construction of churn which is not liable to get out of order, which may be readily and conveniently cleaned, and which may be manufactured at a small cost.

Having thus described my invention, what I claim as new, and desire to secure by Letters Patent, is—

In a churn, the combination of a churn-casing, a crank-shaft journaled in the walls of said casing and provided at the center thereof with oppositely-projecting right-angled offsets or crank-attaching portions, a pair of perforated dashers within said casing, and connecting-rods attached to the dashers and pivotally connected with the said crank portions of the crank-shaft, the said connecting-rods being substantially of the same length as the crank-offsets and the dashers being free to have both reciprocatory and rotary movement, substantially as described.

In testimony whereof I have signed this specification in the presence of two subscribing witnesses.

NICHOLAS OFER.

Witnesses:
 E. L. MUSGRAVE,
 JOHN HERR, Jr.